United States Patent

Peterson et al.

[11] Patent Number: 6,053,615
[45] Date of Patent: Apr. 25, 2000

[54] IMAGE PROJECTOR WITH POLARIZATION CONVERSION SYSTEM

[75] Inventors: Mark D. Peterson, Lake Oswego; Jeffrey A. Gohman, Hillsboro, both of Oreg.

[73] Assignee: In Focus Systems, Inc., Wilsonville, Oreg.

[21] Appl. No.: 08/904,393

[22] Filed: Aug. 1, 1997

[30] Foreign Application Priority Data

Aug. 2, 1996 [DE] Germany ............................ 196 31 180

[51] Int. Cl.[7] ...................................................... G03B 21/14
[52] U.S. Cl. .................................................. 353/20; 349/9
[58] Field of Search ................................. 353/38, 98, 99, 353/122; 362/307, 308, 311, 326, 327, 328, 339, 268, 33; 359/894, 900, 503; 385/123, 130, 131, 132, 133, 146, 901; 349/8, 9

[56] References Cited

U.S. PATENT DOCUMENTS

3,170,980  2/1965  Pritchard .
5,059,013  10/1991  Jain ........................................... 359/503
5,303,084  4/1994  Pflibsen et al. .......................... 359/503
5,625,738  4/1997  Magarill ................................... 385/146
5,634,704  6/1997  Shikama et al. ......................... 353/102
5,764,412  6/1998  Suzuki et al. ............................. 353/20
5,777,789  7/1998  Chiu et al. ................................ 353/34
5,795,049  8/1998  Gleckman ................................ 353/122
5,829,858  11/1998  Levis et al. .............................. 353/122

*Primary Examiner*—William Dowling
*Attorney, Agent, or Firm*—Timothy M. Carlson

[57] ABSTRACT

An image projector has an optical path including, from upstream to downstream, a light source, a light pipe, a polarization conversion prism, a positive lens group and a light valve. The light pipe has an outlet and an inlet, and is constructed to receive light from the light source and to produce a unique projection display format as light is transmitted therethrough. The polarization conversion prism recycles light to optimize the amount of light that is properly polarized in the system. The positive lens group includes at least one positive lens positioned downstream of the polarization conversion prism. The positive lens group images the outlet of the light pipe onto the light valve.

13 Claims, 5 Drawing Sheets

IMAGE PROJECTOR WITH POLARIZATION CONVERSION SYSTEM

FIELD OF THE INVENTION

The present invention pertains to an image projection system, and in particular to optical path components for light polarization conversion.

BACKGROUND AND SUMMARY OF THE INVENTION

For years, projection systems have been used to project motion pictures and still photographs onto display screens. More recently, presentations using multimedia projection systems have become popular for purposes such as sales demonstrations, business meetings, and classroom sessions. In a common mode of operation, multimedia projection systems receive analog video signals from a personal computer (PC). The video signals represent still, partial-, or full-motion display images of the type rendered by the PC. The analog video signals are converted into digital video signals to control a digitally-driven light valve, such as a liquid crystal light valve (LCD), which form display images.

A popular type of multimedia projection system is a projector that incorporates a light source and optical path components upstream and downstream of the light valve to project the display images onto a display screen. Examples such projectors include those sold under the trademark LITEPRO® by In Focus Systems, Inc. of Wilsonville, Oreg., the assignee of the present application.

In LCD-based projectors, light from a light source is polarized by a back polarizer to obtain light with a selected pass orientation. The polarized light is then modulated by an informational pattern of active and inactive (blanked) pixels on a transmissive LCD. The active pixels rotate the polarized light by 90°, and the inactive pixels pass the polarized light without rotation. The modulated light then passes through a front polarizer (analyzer), which blocks the rotated light of the activated pixels, and passes the nonrotated light of the blanked pixels. The modulated light is then projected through a projection lens onto a screen for viewing.

A major design challenge for such LCD-based projectors is the substantial light loss due at the back polarizer. For example, simple polarization wastes about one-half of available light. To minimize this loss, polarization conversion devices have been developed to convert otherwise wasted light to the desired pass orientation. One such conventional device is a polarization conversion prism.

While conventional polarization conversion prisms work adequately, they are often fairly complex, being constructed of numerous pieces of glass defining complex optical paths. For example, U.S. Pat. No. 5,381,278 to Shingaki et al. discloses several conversion prisms having at least three prism components, and a bonded ¼-wave plate and reflection plate. Light that is otherwise wasted is converted to the required pass orientation by passing through the ¼-wave plate, being reflected off the reflection plate and passing back through the ¼-wave plate for a total 90° rotation. While such a prism works adequately, some light is lost in the reflection off the reflection plate and the double transmission through the ¼-wave plate. This light loss tends to be increased by the converted light passing twice through a triangle prism component of the conversion prism. Moreover, the three-prism construction and the bonded ¼-wave and reflection plates tend to be expensive to manufacture.

Conventional projectors also often have dissatisfactory brightness uniformity. Some projectors incorporate fly-eye lenses to integrate the light to improve the uniformity of projected images. Unfortunately, fly-eye lenses are becoming less applicable to today's multimedia projector designs, which require low cost, and toughness for portability. For instance, fly-eye lenses tend to be expensive and fragile. This drawback is worsened in that two fly-eye lenses are often required to produce the desired integration and imaging. Fly eye lenses also tend to make polarization conversion problematic and expensive, in that the rows of lenses making up a fly-eye lens may require a complicated polarization conversion prism with rows of prism components registered with the rows of lenses on the fly eye lens. Furthermore, fly-eye lenses tend to be relatively large in order to provide adequate light integration.

Conventional projectors also have a disadvantage in projecting an image with excess yellow color, resulting in the projected image having an undesirable green or orange tint. This coloration is due to the color spectrum of metal-halide lamps having a spike in the yellow region at about 577 nm.

Thus, in light of these disadvantages, it is a principle object of the present invention to provide a projector with inexpensive, compact and tough means to recover polarized light that would otherwise be wasted.

It is another object of the present invention to provide a projector optical system that eliminates unwanted yellow light from the image.

In accordance with a preferred embodiment of the present invention, a multimedia projector includes, from upstream to downstream, a light source, a light pipe having an inlet and outlet and constructed to receive light from the light source and to produce a unique projection display format as light is transmitted therethrough, a positive lens group including at least one positive lens, and a light valve with an active display region corresponding to the projection display format of the light pipe. The positive lens group images the outlet of the light pipe onto the light valve.

In accordance with another preferred embodiment of the present invention, a polarization conversion prism is positioned downstream of the light pipe.

DETAILED DESCRIPTION OF PREFERRED EMBODIMENTS

In the following Detailed Description, the following definitions apply:

"Position space" is defined as the positional location of light rays in a plane perpendicular to an optical axis.

"Angle space" is defined as vector direction of light rays passing though the plane perpendicular to the optical axis.

"P" light polarization is defined as a polarization pass orientation in the plane of incidence and reflection.

"S" light polarization is defined as a polarization pass orientation that is parallel to the surface of an optical element (i.e. 90° offset from the plane of incidence and reflection).

Figure 1:
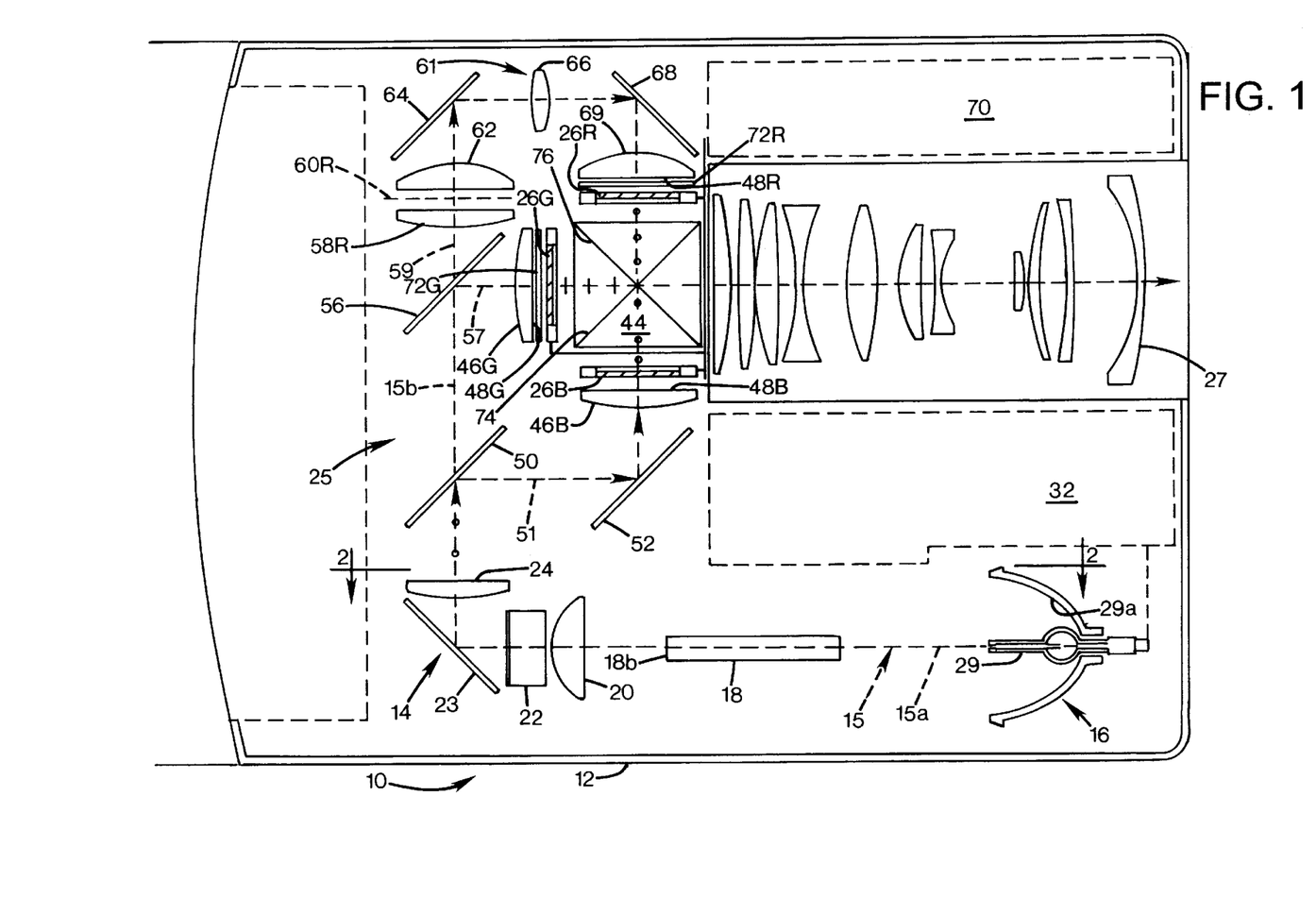
FIG. 1 is a top plan view of a multimedia projector showing a projector optical system according to one preferred embodiment of the present invention.

FIG. 1 generally shows an image projector 10 in accordance with one preferred embodiment of the present invention. The projector includes a housing 12 that supports a projection optical system 14. The optical system, from back to front along an optical path 15, includes a light source 16, a light pipe optical integrator 18 having a inlet 18a and outlet 18b, a first positive lens 20, a polarization conversion prism 22, a reflector 23, a second positive lens 24, a three-path transmissive LCD assembly 25 (including a first LCD 26R, a second LCD 26G and a third LCD 26B), and a telecentric-type projection lens 27.

Figure 2:
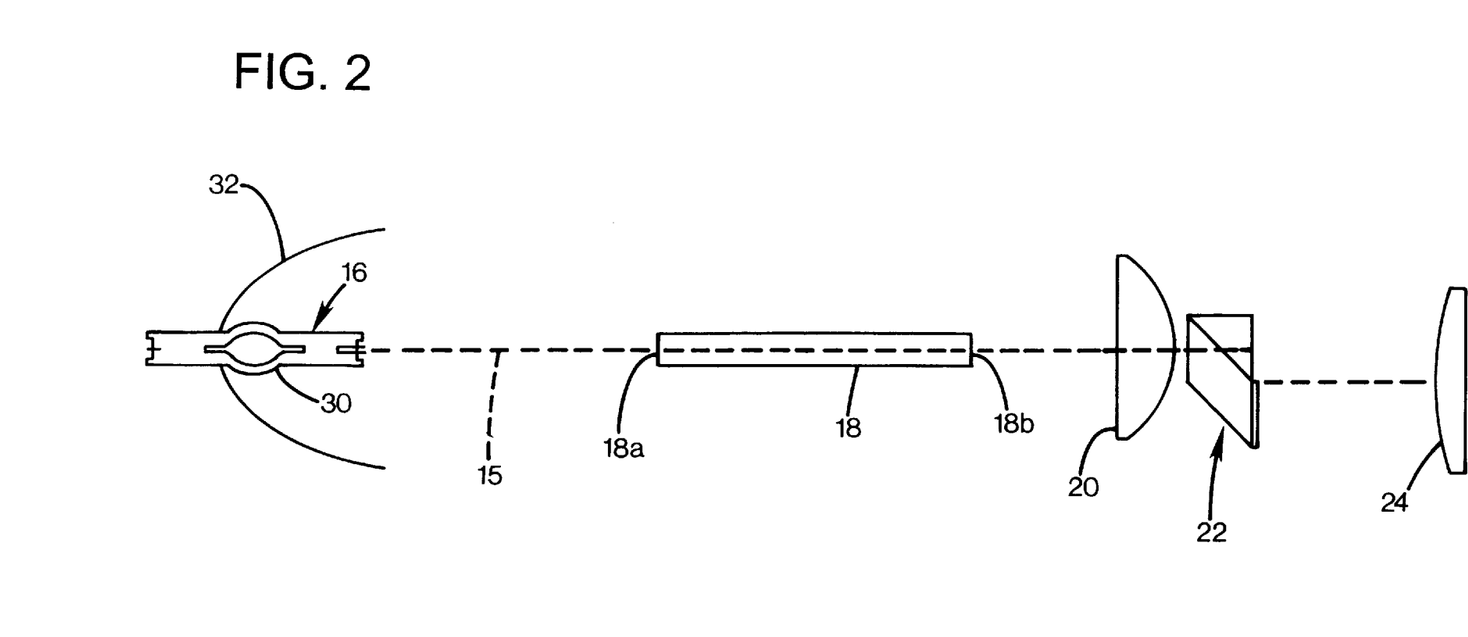
FIG. 2 is an enlarged side view taken along line 2—2 in FIG. 1.
Figure 5:
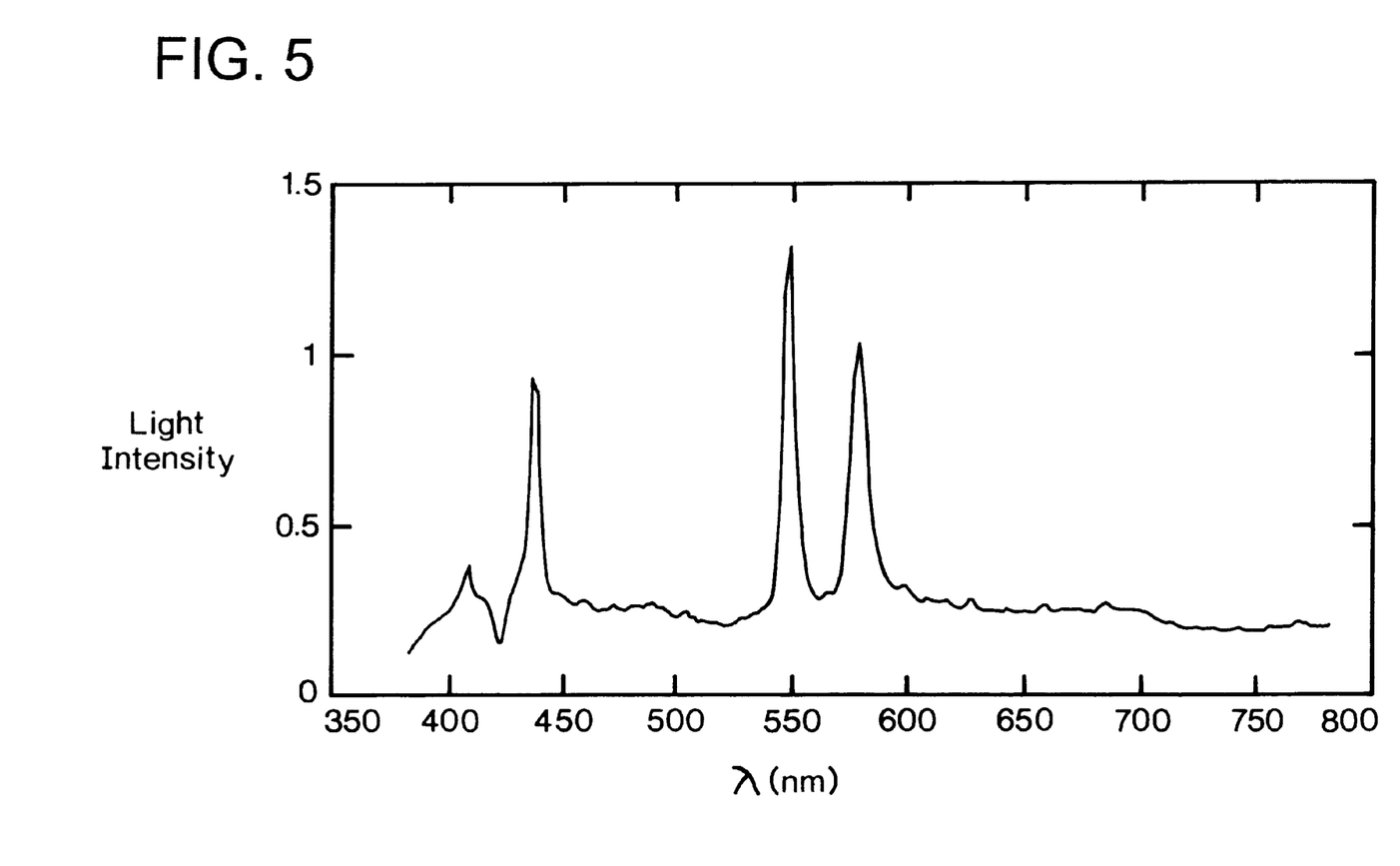
FIG. 5 shows the color spectrum of a conventional metal-halide lamp, showing an intensity spike in the yellow range.

The optical system 14 will now be described in detail. As is best shown in FIG. 2, the light source 16, light pipe 18, first positive lens 20 and conversion prism 22 all are mounted along a first axis 15a of the optical path 15. The light source 16 is preferably a custom-designed short arc metal halide lamp 29. The lamp displays the color spectrum illustrated in FIG. 5. The lamp 29 is housed within an elliptical mirror 29a. The light source is powered by a power supply 32. An optional meniscus lens (not shown) may be disposed downstream of the elliptical mirror 29a to boost the concentration of light focused by the elliptical mirror.

The light pipe 18 and the polarization conversion prism 22 provide for bright, highly uniform projection images. The integrator 18 is located downstream of the light source along the first axis 15a. The integrator is of elongated tunnel type with squared-off flat upstream and downstream end surfaces 18a, 18b. The integrator 18 is situated such that its upstream end 18a is at the "point of least confusion" of the elliptical mirror 29a. The point of least confusion is the point where the ray bundle reflecting from the elliptical mirror has the smallest spot size. In the present embodiment, such point of lest confusion is 6 mm upstream of the focus of the elliptical mirror 29a.

The integrator 18 has a 3×4 cross-section to provide a 3×4 projection display format compatible with SVGA and XGA resolutions. The integrator may also be of other formats, such as 9×16 (HDTV) and 5×4 (SXGA). Moreover, multiple integrators of different cross-sections may be arranged for selective movement into the optical path to provide distinct projection display formats as desired.

The light pipe integrator provides total internal reflection for efficient light transmission. The physical structure of the integrator wall is a polished optical interface. The illustrated integrator is constructed with a single glass core so that the integrator wall forms a glass-air boundary. The integrator may be constructed of various other suitable materials, such as quartz or acrylic with or without a cladding. It is also to be understood that effective integrator devices having other boundary types may be constructed, such as air-metal, dielectric-metal, and dielectric-dielectric.

The light pipe integrator 18 provides a high numerical aperture (NA) that is more than sufficient to receive the light reflecting from the elliptical mirror 29a, in order to ensure optimal light gathering. The preferred light pipe integrator is manufactured by Hughes Elcan Optical Technologies. The high integrator NA permits compact light gathering from the elliptical mirror and compact light dispersion to the first positive lens 20. The integrator has a small cross-sectional area, about 10.4×7.8 mm, that permits a very compact optical path compared to integrator systems utilizing fly-eye lenses.

The integrator 18 integrates the light to provide a uniform light intensity across the projection field. In the preferred embodiment, the light pipe integrator has a length of about 7.5 cm such that light entering the integrator at the most extreme angles (25°) undergoes about 5 reflections at most while passing through the integrator. An integrator of high refractive index permits a shorter optical integrator by permitting increased reflections per given length optical integrator.

The first positive lens 20 is positioned downstream of the integrator along the first axis 15a. The first positive lens 20 collimates the light emitted from the integrator 18. The first positive lens 20 is spaced by its focal distance f1 (see FIG. 4) from the light pipe outlet 18b.

Figure 3:
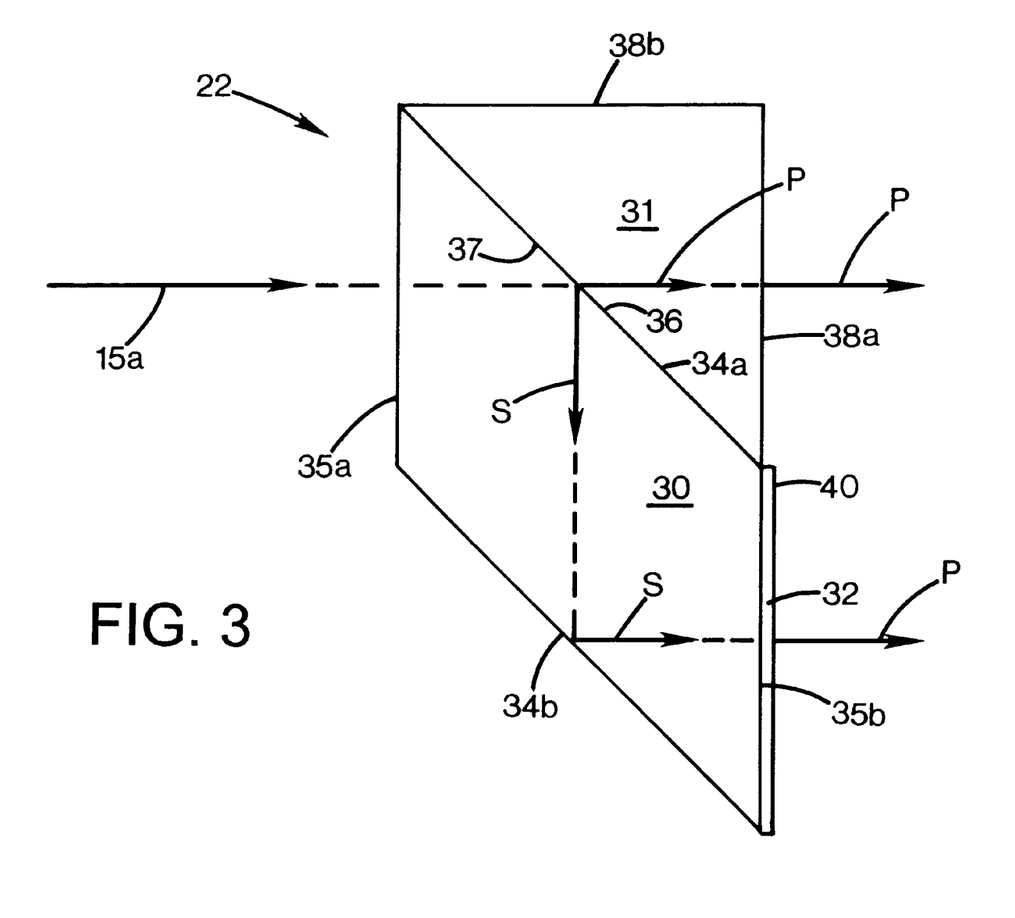
FIG. 3 is an enlarged side view of a polarization conversion prism portion of the projector optical system depicted in FIG. 2.

As illustrated in FIG. 3, the conversion prism 22 is of simple three-piece construction, consisting of a relatively large 45° romboid prism 30, a relatively small right-angle triangle prism 31, and a ½-wave plate 33. The romboid prism 30 has relatively long first and second longitudinal surfaces 34a, 34b and relatively short first and second end surfaces 35a, 35b. The end surfaces 35a, 35b have a 2:1 aspect ratio. The romboid prism is positioned such that the first and second longitudinal surfaces 34a, 34b extend diagonally of the first axis 15a, and the first and second end surfaces 35a, 35b extend perpendicularly of the first axis 15a. The triangle prism has a hypotenuse surface 37, and two end surfaces 38a, 38b on either side of the 90° angle. The hypotenuse surface is sized like and is bonded to the first (upper) longitudinal surface 34a of the romboid prism 30. Thus, the triangle prism 31 and the upper half of the romboid prism 30 form a square shape, with the romboid prism end surface 35b and triangle prism surface 38a being co-planar.

The first (upper) end surface 35a of the romboid prism is directed upstream along optical axis 15a and forms the inlet 35a of the conversion prism 22. The end surface 38a of the triangle prism opposite and parallel to the inlet 35a forms a first outlet 38 of the conversion prism. A polarizing coating 36 is sandwiched between the romboid prism and triangle prism surfaces 34a and 37. The second (i.e. lower) longitudinal surface 34b of the romboid prism is polished to form an internal reflector. The ½-wave plate 33 is sized like and is bonded to the second (lower) end surface 35b of the romboid prism. The exposed surface of the ½-wave plate 32 forms a second outlet 40 of the conversion prism. Thus, the first and second outlets 38a, 40, each with a 2:1 aspect ratio, together form a single outlet of 1:1 aspect ratio. As illustrated in FIG. 2, the optical axis 15 is offset at the prism outlet to compensate for the offset between the prism inlet 35a and outlet 38a, 40.

As illustrated in FIG. 1, the reflector 23 is positioned downstream of the conversion prism 22 at the intersection of the first axis 15a and a perpendicular second axis 15b of the optical path 15. The second positive lens 24 is positioned downstream of the reflector 23, along the second axis 15b. As will be discussed, the first and second positive lenses 20, 24 on either side of prism work to image the integrator outlet 18b onto the LCDs.

The three-path LCD assembly 25 is positioned downstream of the second positive lens 24 along the second axis 15b. A blue light path 51, green light path 57 and red light path 59 extend perpendicularly from the second axis 15b to associated LCDs. A first dichroic mirror 50 for passing green and red light and reflecting blue light is positioned at the intersection of the blue light path and the second axis. A second silver mirror 52 for reflecting blue light is positioned along the blue light path 51. A third dichroic mirror 56 for passing red light and reflecting green light is positioned at the intersection of the green light path and the second axis 15b. The first and third dichroic mirrors are coated on the upstream sides and are made of float glass.

The LCD projection system includes the three LCDs 26R, 26G, 26B, one for each of red, green and blue (RGB) light components. The LCDs are preferably of active matrix polysilicon type. In the prefered example, the LCDs are XGA-resolution LCDs manufactured by Sony Electronic, Inc., under model number LCX017AL. The blue and green LCDs 26B, 26G each have an associated positive lens 46B, 46G with a polarizer and waveplate 48B, 48G laminated thereto. The blue and green positive lenses 46B, 46G make the light telecentric. The polarizer and ½ wave plates are respectively bonded to the positive lenses 46B, 46G in order to tune the polarization angle to obtain maximum image contrast and maximum brightness. The polarizer is positioned closer to the LCD.

Figure 4:
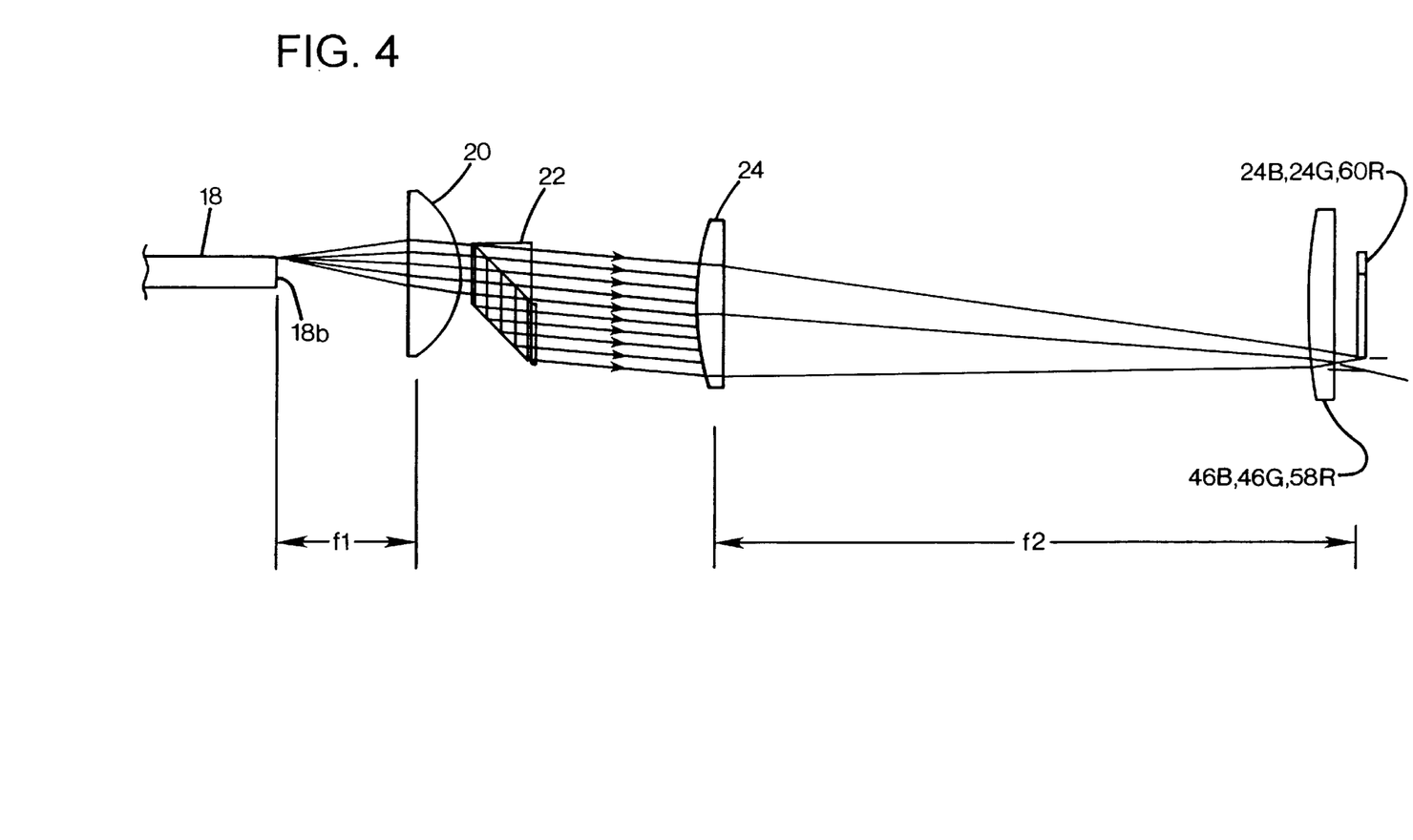
FIG. 4 shows a ray trace along the projection optical system of the present invention, wherein certain optical elements are eliminated for simplicity of illustration.

Viewing the total optical system, as shown in a simplified version in FIG. 4, the first and second positive lenses 20, 24, together with the respective positive blue and green lenses 46B, 46G, make up positive lens groups that image the light pipe outlet 18b onto the LCDs 26B, 26G. The optical path lengths from the second positive lens 24 to the blue and green LCDs 26B, 26G are identical, and defined by the focal length f2 of the lens system comprised of the second positive lens 24 and respective blue and green positive lenses 46B, 46G.

A red positive lens 58R is positioned downstream of the third dichroic mirror 56. The red positive lens 58R combines with the first and second positive lenses 20, 24 to form a red light image at red image plane 60R. The red positive lens is identical to the blue and green positive lenses 46B, 46G. Accordingly, the optical path length f2 from the second positive lens 24 to the red image plane 60R is identical to the path lengths from the second positive lens to the blue and green LCDs 24B, 24G.

A red relay optical system 61 is positioned downstream along the red light path 59 to relay the red image to the red LCD 26R. The red relay optical system 61 includes a first positive relay lens 62 positioned along the second axis 15b, a reflector 64 for reflecting the red light 90°, a second positive relay lens 66, a reflector 68 for reflecting the red light another 90°, and a third positive relay lens 69R. The third positive relay lens 69R is adjacent the red LCD 26R and has a laminated polarizer and waveplate 48R, much like the blue and green positive lenses 46B, 46G. The lenses 62 and 69 are of identical construction. Red and green clean-up filters 72R, 72G are attached adjacent the red and green LCDs 24R, 24G in order to absorb unwanted yellow light (i.e. wavelengths around 577 nm).

An LCD drive electronics unit 70 containing a CPU controls the LCDs to modulate the polarized light incident on the LCDs. The LCDs surround an X-prism 44 on three sides. The fourth side of the X-prism is directed toward the projection lens 27.

Operation

In operation, unpolarized light generated by the lamp 16 is condensed by the elliptical mirror 29a to a focus at the inlet 18a of the light pipe integrator. The light is reflected sufficiently within the integrator 18 so that the light exiting the integrator outlet 18b is very uniform in position space (i.e. highly uniform in intensity) but nonuniform in angle space. The first positive lens 20 collimates the light, and converts the uniform position space of the incoming light to a uniform angle space and the nonuniform angle space to a nonuniform position space. The result is an approximately circular light field of low uniformity that is superposed on the conversion prism inlet 35a.

The conversion prism receives the unpolarized light through inlet 35a and outputs P polarized light (relative to surface 37) from both the first and second outlets 38a, 40. The polarizing coating 36 at the interface of the romboid and triangle prisms passes P polarized light to the first outlet 38 and reflects S polarized light 90° downward to the romboid prism mirrored surface 34b. The mirrored surface reflects the S polarized light 90° toward the ½-wave plate 33. The ½-wave plate rotates the polarization plane of the S polarized light by 90° to a P polarization, and outlets the P polarized light in parallel with the P polarized light outlet from the first outlet 38a. Thus, only two reflections are required in the present prism to convert to P polarization, resulting in high optical efficiency. While the S polarized light is converted to P polarized light in this embodiment, it is contemplated that the ½-wave plate may be moved to cover the first outlet 38a, in order that the P polarized light be converted to an S polarization.

As is best shown in FIG. 4, the combination of the first and second positive lenses image the integrator outlet 18b onto the LCDs, with the 4×3 shape of the outlet being preserved. To best demonstrate this operation, light rays emerging from a single point on the upper edge of the integrator outlet 18b are traced to their focus on the blue and green LCDs 26B, 26G or red image plane 60R. The rays emerging from the integrator outlet are collimated by the first positive lens 20 and enter the conversion prism 22. The number of rays are doubled through the splitting of S and P light in the conversion prism. The P polarized rays emerging from the conversion prism 22 are refracted by the second positive lens 24 and either lens 46B, 46G or 58R to a focus on LCD 26B, 26G, or red image plane 60R respectively.

Explained a different way, the uniformity and 4×3 aspect ratio information of light exiting the integrator 18 is held in position space, which is transformed into angle space by the first positive lens 20 (i.e. the spacial information is held in the angles). The 4×3 aspect ratio information remains in angle space through the conversion prism 22 as all light is converted to P polarized light. The P polarized light exiting the conversion prism 22 is uniform in angle space and non-uniform in position space. The second positive lens 24 and respective lenses 46B, 46G, 58R then transform the angle space back to position space with the 4×3 aspect ratio and high uniformity.

Referring now to the detailed operation of the three-path LCD assembly, polarized light is passed though the second positive lens 24 along the second axis to the first dichroic mirror 50. The first mirror 50 passes green and red light along the second axis 15b and reflects blue light at 90° along the blue light path 51. The silver mirror 52 reflects the blue light at 90° (co-directional with the second axis 15bb) towards the telecentric lens element 46B, LCD 26B and the center of the X-prism 44. The blue light is focused at the LCD 26B, where it is modulated by the LCD 26B.

The green and red light passes through the first dichroic mirror 50 to the third dichroic mirror 56 positioned downstream along the second axis 15b. The third dichroic mirror 56 passes red light along the second axis 15b and reflects green light 90° along the green light path 57. The red light passes along the second axis 15b through a red light positive lens 58R, which forms an image at image plane 60R. The image is then relayed to the red LCD 26R by the relay lens system.

Each of the RGB components of light is refracted through associated telecentric lens 46R, 46B, 46G, and passes through associated waveplate and polarizer 48R, 48B, 48G before being focused on associated LCD 26R, 26G, 26B. The RGB light components are appropriately modulated by the LCDs, and the modulated RGB light components are synthesized (i.e. recombined) at the dichroic mirror X-prism 44 at the intersection of the blue, green and red light paths 51, 57, 59. X-prism 44 includes four right triangular dichroic prisms bonded to each other. A blue light reflection dichroic mirror surface 74 crosses at a right angle to a red light reflection dichroic mirror surface 76. During color synthesis, the red light and the blue light are synthesized respectively by one reflection and green light is synthesized by transmission (with no reflection). These RGB light images are guided to the projection lens 27 for projection onto a screen or the like. The projection lens may be a variable zoom lens system as shown in FIG. 1, or a fixed focal length lens system.

It should be apparent that the invention may be embodied in other specific forms without departing from its spirit or essential characteristics. For instance, the specific optical paths and optical system components shown in the Figures are strictly exemplary. The optical systems and polarization conversion prisms under the present invention may take a variety of other forms. Moreover, the optical system described herein may be modified to work with other types of reflective and transmissive light valves. Accordingly, the described embodiments are to be considered in all respects only as illustrated and not restrictive and the scope of the invention is, therefore, indicated by the appended claims.

What is claimed is:

1. A polarization conversion system comprising:

a light source;

a light pipe positioned downstream of the light source, the light pipe constructed to receive light from the light source and to produce a unique projection display format as light is transmitted therethrough, the light pipe having an inlet and an outlet;

a positive lens group including at least one positive lens positioned downstream of the light pipe, wherein the positive lens group also includes a second positive lens, and a polarization conversion prism positioned between the first positive lens and the second positive lens; and a light valve positioned downstream of the first positive lens, wherein the positive lens group images the outlet of the light pipe onto the light valve.

2. The system of claim 1, further comprising a polarization conversion prism positioned downstream of the light pipe.

3. The system of claim 2, wherein the polarization conversion prism includes a relatively large 45° romboid prism, a relatively small right-angle triangle prism, and a ½-wave plate.

4. The system of claim 1, wherein the light pipe outlet has a 4×3 aspect ratio.

5. A polarization conversion system comprising:

a light source;

a light pipe positioned downstream of the light source, the light pipe constructed to receive light from the light source and to produce a unique projection display format as light is transmitted therethrough; and a polarization conversion prism having a relatively large 45° romboid prism, a relatively small right-angle triangle prism, and a ½-wave plate;

a first positive lens positioned between the light pipe and the conversion prism;

a second positive lens positioned downstream of the conversion prism; and LCD image object positioned downstream of the second positive lens;

wherein the shape of the light pipe outlet is imaged by the first and the second positive lenses onto the LCD.

6. The system of claim 5, wherein the romboid prism has relatively long first and second longitudinal surfaces and relatively short first and second end surfaces;

the triangle prism has a hypotenuse surface that is sized like and is bonded to the first longitudinal surface 34a of the romboid prism with a polarizing coating sandwiched therebetween;

the second longitudinal surface of the romboid prism is polished to form an internal reflector; and the ½-wave plate is sized like and is bonded to the second end surface of the romboid prism.

7. The system of claim 5, wherein the light pipe has a 3×4 cross-section.

8. The system of claim 5, wherein the light pipe is unclad.

9. The system of claim 5, wherein the light pipe has a length of 7.5 cm.

10. The system of claim 5, wherein the light pipe has a width of 10.4 mm and a height of 7.8 mm.

11. The system of claim 6, wherein a positive lens is positioned between the light pipe and the polarization conversion prism, the positive lens operable to collimate light emitted from the light pipe.

12. The system of claim 11, wherein the positive lens is operable to produce an illumination field that encompasses the first end surface of the romboid prism.

13. The system of claim 6, wherein the polarizing coating at the first longitudinal surface passes P polarized light into the triangle prism and reflects S polarized light toward the second longitudinal surface, the second longitudinal surface having a polished for reflecting via total internal reflection the S polarized light toward the ½-wave plate for conversion to P polarization, such that only P polarized light exits the triangle prism and ½-wave plate.

* * * * *

UNITED STATES PATENT AND TRADEMARK OFFICE
CERTIFICATE OF CORRECTION

PATENT NO. : 6,053,615
APPLICATION NO. : 08/904393
DATED : April 25, 2000
INVENTOR(S) : Mark D. Peterson and Jeffrey A. Gohman

It is certified that error appears in the above-identified patent and that said Letters Patent is hereby corrected as shown below:

On the Title Page

"Foreign Application Priority Data, Aug. 2, 1996 [DE] Germany 196 31 180" should be deleted in its entirety.

Signed and Sealed this

Twenty-ninth Day of December, 2009

David J. Kappos
*Director of the United States Patent and Trademark Office*